United States Patent
Coleman

[19]

[11] Patent Number: 6,125,796
[45] Date of Patent: Oct. 3, 2000

[54] STAGED INJECTION OF AN EMULSIFIED DIESEL FUEL INTO A COMBUSTION CHAMBER OF A DIESEL ENGINE

[75] Inventor: Gerald N. Coleman, Peoria, Ill.

[73] Assignee: Caterpillar Inc., Peoria, Ill.

[21] Appl. No.: 09/025,592

[22] Filed: Feb. 18, 1998

[51] Int. Cl.[7] ................................................. F02B 47/00
[52] U.S. Cl. ....................... 123/25 E; 123/25 C; 123/299
[58] Field of Search ............................ 123/25 E, 25 C, 123/299

[56] References Cited

U.S. PATENT DOCUMENTS

| | | | |
|---|---|---|---|
| 2,356,627 | 8/1944 | Skaredoff | 103/41 |
| 2,692,587 | 10/1954 | Barber | 123/304 |
| 4,403,944 | 9/1983 | Dyykkönen | 431/90 |
| 4,412,512 | 11/1983 | Cottell | 123/25 E |
| 4,414,940 | 11/1983 | Loyd | 123/299 |
| 4,543,930 | 10/1985 | Baker | 123/299 |
| 4,640,234 | 2/1987 | Olsson et al. | 123/557 |
| 4,732,114 | 3/1988 | Binder et al. | 123/25 E |
| 4,831,971 | 5/1989 | Ott et al. | 123/25 A |
| 4,836,161 | 6/1989 | Abthoff et al. | 123/299 |
| 5,115,776 | 5/1992 | Ohno et al. | 123/299 |
| 5,119,780 | 6/1992 | Ariga | 123/300 |
| 5,125,367 | 6/1992 | Ulrich et al. | 123/25 E |
| 5,156,114 | 10/1992 | Gunnerman | 123/1 A |
| 5,167,210 | 12/1992 | Leroy | 123/300 |
| 5,170,751 | 12/1992 | Tosa et al. | 123/25 C |
| 5,241,935 | 9/1993 | Beck et al. | 123/300 |
| 5,245,953 | 9/1993 | Shimada et al. | 123/25 E |
| 5,271,362 | 12/1993 | Kobayashi et al. | 123/299 |
| 5,341,783 | 8/1994 | Beck et al. | 123/446 |
| 5,365,902 | 11/1994 | Hsu | 123/299 |
| 5,400,746 | 3/1995 | Susa et al. | 123/25 C |
| 5,402,760 | 4/1995 | Takeuchi et al. | 123/300 |
| 5,460,128 | 10/1995 | Kruse | 123/27 R |
| 5,542,379 | 8/1996 | Kessler | 123/25 C |
| 5,551,391 | 9/1996 | Beck et al. | 123/305 |
| 5,566,650 | 10/1996 | Kruse | 123/27 R |
| 5,682,842 | 11/1997 | Coleman et al. | 123/25 C |
| 5,727,519 | 3/1998 | Kawamura | 123/262 |
| 5,740,775 | 4/1998 | Enderle et al. | 123/299 |

FOREIGN PATENT DOCUMENTS 86 04111   7/1986   WIPO ............................... F02B 7/02

*Primary Examiner*—Henry C. Yuen
*Assistant Examiner*—Hai Huynh
*Attorney, Agent, or Firm*—Maginot, Addison & Moore

[57] ABSTRACT

A method of operating a diesel engine which overcomes problems encountered during use of a low cetane fuel with long ignition delays is disclosed. The method provides for a staged injection of an emulsified diesel fuel into the combustion chamber of the diesel engine. In particular, the method includes the steps of (A) injecting a pilot volume of an emulsified diesel fuel into a combustion chamber of the diesel engine, wherein the emulsified diesel fuel includes water and diesel fuel, (B) compressing the pilot volume of the emulsified diesel fuel within the combustion chamber during a compression stroke of the diesel engine, and (C) injecting a main volume of the emulsified diesel fuel into the combustion chamber of the diesel engine, whereby heat generated by compression of the pilot volume of the emulsified diesel fuel causes the pilot volume of the emulsified diesel fuel to combust so as to ignite the main volume of the emulsified diesel fuel.

17 Claims, 1 Drawing Sheet

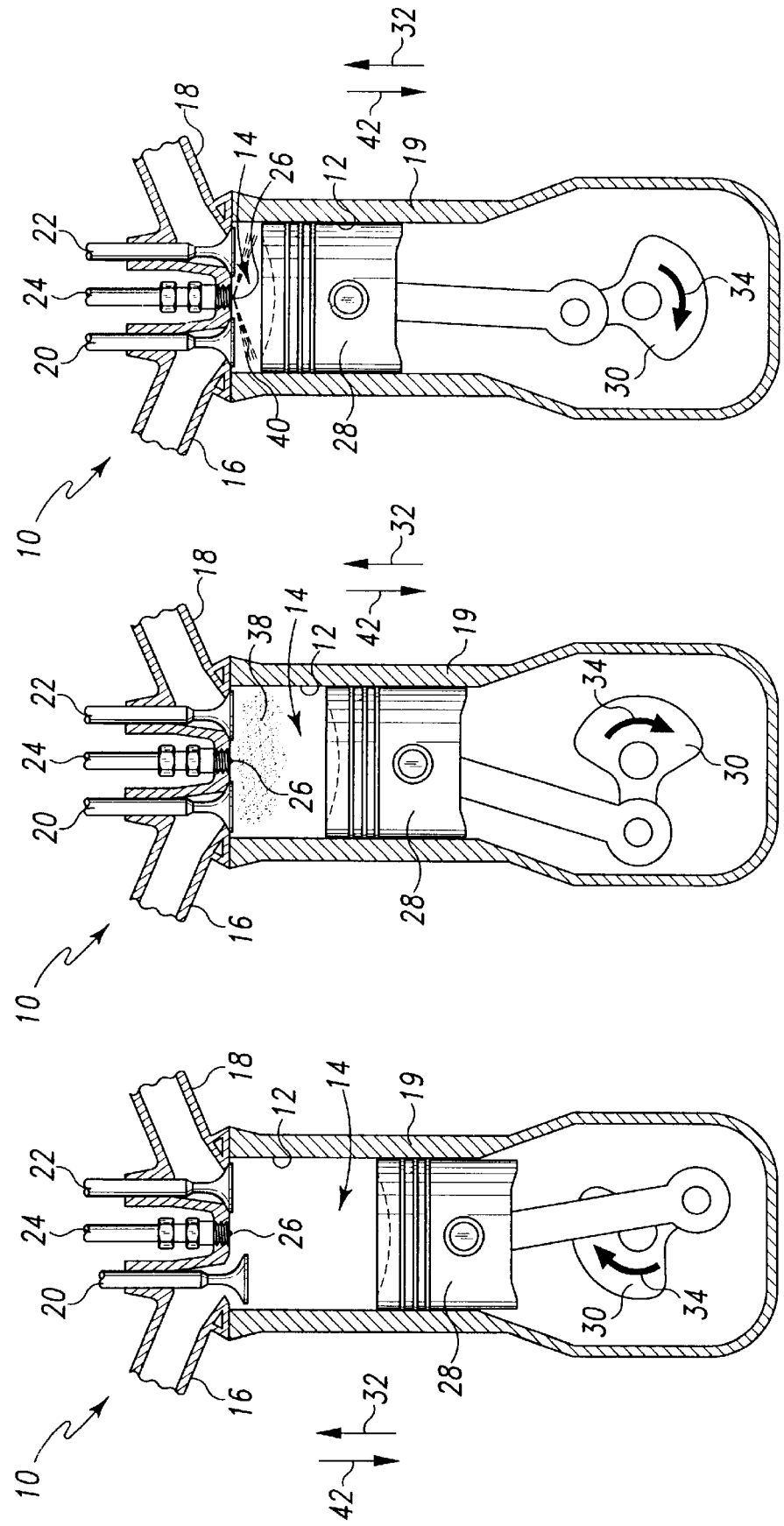

US 6,125,796

STAGED INJECTION OF AN EMULSIFIED DIESEL FUEL INTO A COMBUSTION CHAMBER OF A DIESEL ENGINE

TECHNICAL FIELD OF THE INVENTION

The present invention relates generally to a method of operating a diesel engine, and more particularly to a method of operating a diesel engine by injecting into a combustion chamber thereof a pilot volume of an emulsified diesel fuel prior to injecting a main volume of the emulsified diesel fuel.

BACKGROUND OF THE INVENTION

It is desirable under certain circumstances to operate a diesel engine on a low cetane fuel. However, low cetane fuels typically have poor ignition quality. Specifically, low cetane fuels generally have relatively long ignition delays. That is, a relatively long period of time elapses between the time the low cetane fuel is injected into a combustion chamber of the diesel engine and the time the low cetane fuel actually ignites.

Accordingly, one draw back to utilizing low cetane fuels is that their relatively long ignition delays cause starting problems in diesel engines. In addition, the long ignition delay can cause the diesel engine to misfire under light loads.

What is needed therefore is a method of operating a diesel engine on a low cetane fuel which overcomes one or more of the above-mentioned drawbacks.

DISCLOSURE OF THE INVENTION

In accordance with a first embodiment of the present invention, there is provided a method of operating a diesel engine, with the diesel engine having (i) a combustion chamber, and (ii) a fuel injector having an injection port positioned in fluid communication with the combustion chamber. The method includes the steps of (A) injecting a pilot volume of an emulsified diesel fuel into the combustion chamber with the fuel injector, (B) compressing the pilot volume of the emulsified diesel fuel within the combustion chamber during a compression stroke of the diesel engine, and (C) injecting a main volume of the emulsified diesel fuel into the combustion chamber with the fuel injector, whereby heat generated by compression of the pilot volume of the emulsified diesel fuel causes the pilot volume of the emulsified diesel fuel to combust so as to ignite the main volume of the emulsified diesel fuel.

In accordance with a second embodiment of the present invention, there is provided a method of operating a diesel engine. The method includes the steps of (A) injecting a pilot volume of an emulsified diesel fuel into a combustion chamber of the diesel engine, wherein the emulsified diesel fuel includes water and diesel fuel, (B) compressing the pilot volume of the emulsified diesel fuel within the combustion chamber during a compression stroke of the diesel engine, and (C) injecting a main volume of the emulsified diesel fuel into the combustion chamber during the compression stroke of the diesel engine, whereby heat generated by compression of the pilot volume of the emulsified diesel fuel causes the pilot volume of the emulsified diesel fuel to combust so as to ignite the main volume of the emulsified diesel fuel.

In accordance with a third embodiment of the present invention, there is provided a method of operating a diesel engine, with the diesel engine having a fuel injector. The method includes the steps of (A) injecting a pilot volume of an emulsified diesel fuel into a combustion chamber of the diesel engine with the fuel injector, wherein the emulsified diesel fuel includes water and diesel fuel, (B) compressing the pilot volume of the emulsified diesel fuel within the combustion chamber during a compression stroke of the diesel engine, and (C) injecting a main volume of the emulsified diesel fuel into the combustion chamber with the fuel injector during the compression step, whereby heat generated by compression of the pilot volume of the emulsified diesel fuel causes the pilot volume of the emulsified diesel fuel to combust so as to ignite the main volume of the emulsified diesel fuel.

BRIEF DESCRIPTION OF THE DRAWINGS

FIG. 1 is a fragmentary side elevational view, partially in cross section, of a diesel engine which incorporates the features of the present invention therein, with the engine shown during an intake stroke;

FIG. 2 is a view similar to FIG. 1, but showing the engine during a compression stroke; and FIG. 3 is a view similar to FIG. 2, but showing the engine at a later part of the compression stroke as compared to FIG. 2.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a fragmentary side elevational view, partially in cross section, of a four stroke diesel engine 10. Engine 10 includes a piston 28 and a crankshaft 30 operatively coupled to piston 28. Piston 28 is positioned in a cylinder 12 defined in an engine block 19 of the engine 10. Cylinder 12 defines a combustion chamber 14. Engine 10 further includes a fuel injector 24. Fuel injector 24 has an injection port 26 which is in fluid communication with cylinder 12.

In addition, fuel injector 24 is electrically coupled to an engine control module (not shown) in order to control a staged injection into combustion chamber 14 of (i) a pilot volume 38 of an emulsified diesel fuel (see FIG. 2) and (ii) a main volume 40 of the emulsified diesel fuel (see FIG. 3).

What is meant herein by the term "pilot volume" (i.e. pilot volume 38) is a volume of emulsified diesel fuel which when combusted in combustion chamber 14 would be effective to ignite a substantially greater volume (i.e. main volume 40) of the emulsified diesel fuel which is injected into combustion chamber 14 at about the same time the pilot volume is combusting. It should be appreciated that the pilot volume injected into combustion chamber 14 by fuel injector 24 represents a quantity (i.e. a volume) of emulsified diesel fuel which contributes about 1% to about 5% of the total amount of energy released by the combustion of the combination of (i) the emulsified diesel fuel contained in pilot volume 38, and (ii) the emulsified diesel fuel contained in main volume 40. For example, the pilot volume 38 may equal about 1.0% to about 5.0% of the total volume (i.e. 100%) of the emulsified diesel fuel that fuel injector 24 injects into combustion chamber 14 during one engine cycle.

What is meant herein by the term "main volume" is a volume of emulsified diesel fuel which is substantially greater than the pilot volume and which when combusted within combustion chamber 14 is effective to drive the crankshaft 30 into rotation to achieve normal operation of an engine. It should be appreciated that the main volume injected into combustion chamber 14 by fuel injector 24 represents a quantity (i.e. a volume) of emulsified diesel fuel which contributes about 95% to about 99% of the total amount of energy released by the combustion of the mixture of (i) the emulsified diesel fuel contained in pilot volume 38, and (ii) the emulsified diesel fuel contained in main volume 40. For example, the main volume 40 may equal to about 95% to about 99% of the total volume (i.e. 100%) of the emulsified diesel fuel that fuel injector 24 injects into combustion chamber 14 during one engine cycle.

Therefore, it should be appreciated that if during one engine cycle, the pilot volume 38 is equal to about 1% of the total volume of the emulsified diesel fuel injected into combustion chamber 14, then the main volume 40 would be equal to about 99% of the total volume of the emulsified diesel fuel injected into combustion chamber 14 during one engine cycle. Correspondingly, if the pilot volume 38 is equal to about 5% of the total volume of the emulsified diesel fuel injected into combustion chamber 14 during one engine cycle, then the main volume 40 would be equal to 95% of the total volume of the emulsified diesel fuel injected into combustion chamber 14 during one engine cycle.

The emulsified diesel fuel is a low cetane fuel which includes water and liquid fuel. Preferably, the liquid fuel is diesel fuel. Moreover, in order to provide meaning to the term "water" as it is used in this document, the term "water" is used to mean a quantity of water in a mixture wherein the weight percentage of water in the mixture is more than a deminimis amount which would normally occur in a liquid (such as diesel fuel alone) as a result of the liquid being exposed to its ambient surroundings during processing, transportation, and use thereof. For example, the emulsified diesel fuel is preferably an emulsion of water in diesel fuel at a water to fuel ratio of about X% water by weight, where $5<X<60$, and more preferably where $10<X<50$. In addition, the emulsified diesel fuel may have (i) the water as the continuous phase and the diesel fuel as the discontinuous phase, or alternatively (ii) the diesel fuel as the continuous phase and the water as the discontinuous phase. Moreover, the emulsified diesel fuel may include any appropriate emulsifying agent. One example of an emulsified diesel fuel which may be used as the emulsified diesel fuel in the present invention is disclosed in U.S. patent application Ser. No. 09/024,916 (Caterpillar File No. 97-131), entitled "Fuel Emulsion Blending System", by Gerald Coleman, Ed Jakush, Carlos Cortes, and Richard Cemenska filed on Feb. 17, 1998, the disclosure of which is hereby incorporated by reference.

Engine 10 also includes a valve 20 having a rocker arm (not shown) and a push rod (not shown) operatively associated therewith. In addition, engine 10 also includes a valve 22 having a rocker arm (not shown) and a push rod (not shown) operatively associated therewith. Valves 20 and 22, are operatively associated with cylinder 12. Engine 10 also includes an air intake conduit 16 which is in fluid communication with cylinder 12. Engine 10 further includes an exhaust conduit 18 which is in fluid communication with cylinder 12.

As previously mentioned, engine 10 is a four stroke diesel engine. The first stroke is an intake stroke (see FIG. 1) in which rotation of a cam (not shown) actuates the rocker arm (not shown) and the push rod (not shown) operatively associated with valve 20 such that valve 20 is moved in a direction indicated by arrow 42. Moving valve 20 in the direction indicated by arrow 42 places cylinder 12 in fluid communication with air intake conduit 16. Placing cylinder 12 in fluid communication with air intake conduit 16 allows air to be advanced into cylinder 12 (and therefore combustion chamber 14) as crankshaft 30 rotates in a direction indicated by arrow 34 thus causing piston 28 to travel in a direction indicated by arrow 32.

As shown in FIG. 2, once the intake stroke is complete, engine 10 advances to a compression stroke. During the compression stroke, valve 20 is positioned such that air intake conduit 16 is isolated from fluid communication with cylinder 12, and crankshaft 30 causes piston 28 to travel in a direction indicated by arrow 32. During the compression stroke, the engine control module (not shown) generates a pilot output signal thereby actuating fuel injector 24 so as to start an injection (via injection port 26) of a pilot volume 38 of the emulsified diesel fuel into cylinder 12. Preferably, the injection of pilot volume 38 of the emulsified diesel fuel into cylinder 12 is started when crankshaft 30 is positioned between about 2° to about 120° before top dead center (BTDC) during the compression stroke as shown in FIG. 2. Injection of pilot volume 38 of the emulsified diesel fuel into cylinder 12 creates a mixture within cylinder 12 which includes (i) air, and (ii) the emulsified diesel fuel. Near the top of the compression stroke, the heat generated as a result of compressing the aforementioned mixture causes the pilot volume 38 of the emulsified diesel fuel contained in the combustion chamber 14 to combust.

As shown in FIG. 3, at about the same time as the pilot volume 38 of the emulsified combusts, the engine control module (not shown) generates a main output signal thereby actuating fuel injector 24 so as to start an injection of a main volume 40 of the emulsified diesel fuel into cylinder 12. In particular, the injection of the main volume 40 of the emulsified diesel fuel into cylinder 12 is started when crankshaft 30 is positioned between about 18° to about 0° before top dead center (BTDC) during the compression stroke of engine 10 as shown in FIG. 3. It should be understood that 0° BTDC represents the position of crankshaft 30 at top dead center (TDC). In addition, it should be understood that the injection of main volume 40 can be started when crankshaft 30 is positioned past TDC (i.e. during the power stroke of engine 10). Specifically, the injection of main volume 40 can be started during the power stroke of engine 10 when crankshaft 30 is positioned at about 1° to about 5° past TDC. Combustion of the pilot volume 38 of the emulsified diesel fuel causes the main volume 40 of the emulsified diesel fuel to ignite.

Ignition and then the subsequent combustion of the pilot volume 38 and the main volume 40 of the emulsified diesel fuel causes exhaust gases to be formed in the combustion chamber 14. During the power stroke, the piston 28 is driven in the direction indicated by arrow 42 by the exhaust gases so as to rotate crankshaft 30 in the direction indicated by arrow 34.

Thereafter, engine 10 is advanced to an exhaust stroke (not shown) in which another push rod (not shown) is actuated by a cam (not shown) so as to open valve 22 and place cylinder 12 in fluid communication with exhaust conduit 18. The exhaust gases formed from the combustion of the pilot volume 38 and the main volume 40 of the emulsified diesel fuel are then advanced from cylinder 12 to exhaust conduit 18 by the movement of piston 28 in the direction indicated by arrow 32 during the exhaust stroke.

Collectively, the intake stroke, the compression stroke, the power stroke, and the exhaust stroke are included in one engine cycle of engine 10. Once the exhaust stroke is completed, the intake stroke is repeated to initiate another engine cycle.

Industrial Applicability

It should be appreciated that the aforementioned problems associated with long ignition delays caused by use of low cetane fuels can be overcome by use of the present invention. In particular such problems can be overcome by (i) injecting the pilot volume 38 of the emulsified diesel fuel into the combustion chamber 14 with the fuel injector 24, (ii) compressing the pilot volume 38 of the emulsified diesel fuel within the combustion chamber 14 during the compression stroke of the engine 10, and (iii) injecting the main volume 40 of the emulsified diesel fuel into the combustion chamber 14 with the fuel injector 24 so that heat generated by compression of the pilot volume 38 of the emulsified diesel fuel causes the pilot volume 38 to combust so as to ignite the main volume 40 of the emulsified diesel fuel. It should be noted that a period of time elapses between injection of the pilot volume 38 of the emulsified diesel fuel into the combustion chamber 14 and injection of the main volume 40 of the emulsified diesel fuel into the combustion chamber 14.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of operating a diesel engine, with the diesel engine having (i) a combustion chamber, and (ii) a fuel injector having an injection port positioned in fluid communication with the combustion chamber, comprising the steps of:
   injecting a pilot volume of an emulsified diesel fuel into said combustion chamber with said fuel injector;
   compressing said pilot volume of said emulsified diesel fuel within said combustion chamber during a compression stroke of said diesel engine; and
   injecting a main volume of said emulsified diesel fuel into said combustion chamber with said fuel injector, whereby heat generated by compression of said pilot volume of said emulsified diesel fuel causes said pilot volume of said emulsified diesel fuel to combust so as to ignite said main volume of said emulsified diesel fuel.

2. The method of claim 1, wherein said main volume is injected into said combustion chamber by said fuel injector during said compression step.

3. The method of claim 2, wherein said emulsified diesel fuel includes water and diesel fuel.

4. The method of claim 3, wherein:
   said emulsified diesel fuel comprises an emulsion of water in diesel fuel at a water to fuel ratio of X% by weight, and
   $5<X<60$.

5. The method of claim 2, wherein both said pilot volume injecting step and said main volume injecting step occur during said compression stroke of said diesel engine.

6. The method of claim 2, wherein:
   said diesel engine further includes a crankshaft,
   said pilot volume injecting step occurs when said crankshaft is located at about 2° to about 120° BTDC, and
   said main volume injecting step occurs when said crankshaft is located at about 2° to about 10° BTDC.

7. The method of claim 2, wherein a period of time elapses between the pilot volume injecting step and the main volume injecting step.

8. A method of operating a diesel engine, comprising the steps of:
   injecting a pilot volume of an emulsified diesel fuel into a combustion chamber of said diesel engine, wherein said emulsified diesel fuel includes water and diesel fuel;
   compressing said pilot volume of said emulsified diesel fuel within said combustion chamber during a compression stroke of said diesel engine; and
   injecting a main volume of said emulsified diesel fuel into said combustion chamber during said compression stroke of said diesel engine, whereby heat generated by compression of said pilot volume of said emulsified diesel fuel causes said pilot volume of said emulsified diesel fuel to combust so as to ignite said main volume of said emulsified diesel fuel.

9. The method of claim 8, wherein:
   said emulsified diesel fuel comprises an emulsion of water in diesel fuel at a water to fuel ratio of X% by weight, and
   $5<X<60$.

10. The method of claim 8, wherein both said pilot volume injecting step and said main volume injecting step occurs during said compression stroke of said diesel engine.

11. The method of claim 8, wherein:
    said diesel engine further includes a crankshaft,
    said pilot volume injecting step occurs when said crankshaft is located at about 5° to about 120° BTDC, and
    said main volume injecting step occurs when said crankshaft is located at about 2° to about 10° BTDC.

12. The method of claim 8, wherein a period of time elapses between the pilot volume injecting step and the main volume injecting step.

13. A method of operating a diesel engine, with the diesel engine having a fuel injector, comprising the steps of:
    injecting a pilot volume of an emulsified diesel fuel into a combustion chamber of said diesel engine with said fuel injector, wherein said emulsified diesel fuel includes water and diesel fuel;
    compressing said pilot volume of said emulsified diesel fuel within said combustion chamber during a compression stroke of said diesel engine; and
    injecting a main volume of said emulsified diesel fuel into said combustion chamber with said fuel injector during said compression step, whereby heat generated by compression of said pilot volume of said emulsified diesel fuel causes said pilot volume of said emulsified diesel fuel to combust so as to ignite said main volume of said emulsified diesel fuel.

14. The method of claim 13, wherein:
    said emulsified diesel fuel comprises an emulsion of water in diesel fuel at a water to fuel ratio of X% by weight, and
    $5<X<60$.

15. The method of claim 13, wherein both said pilot volume injecting step and said main volume injecting step occur during said compression stroke of said diesel engine.

16. The method of claim 13, wherein:
    said diesel engine further includes a crankshaft,
    said pilot volume injecting step occurs when said crankshaft is located at about 5° to about 120° BTDC, and
    said main volume injecting step occurs when said crankshaft is located at about 2° to about 10° BTDC.

17. The method of claim 13, wherein a period of time elapses between the pilot volume injecting step and the main volume injecting step.

* * * * *